(12) United States Patent
Hammaker et al.

(10) Patent No.: US 7,210,729 B2
(45) Date of Patent: May 1, 2007

(54) WINDSHIELD GASKET DESIGN

(75) Inventors: Aaron M. Hammaker, West Milton, OH (US); Renji Maki, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 10/881,787

(22) Filed: Jun. 30, 2004

(65) Prior Publication Data
US 2006/0001290 A1 Jan. 5, 2006

(51) Int. Cl.
*B60J 1/10* (2006.01)
*B60J 10/02* (2006.01)

(52) U.S. Cl. ............... 296/146.15; 296/93; 52/204.597

(58) Field of Classification Search .......... 296/146.15, 296/93; 52/204.597
See application file for complete search history.

(56) References Cited

U.S. PATENT DOCUMENTS

| | | | |
|---|---|---|---|
| 4,304,075 A | 12/1981 | Miyoshi | |
| 4,401,340 A | 8/1983 | Ankrapp et al. | |
| 4,757,659 A | 7/1988 | Miyakawa et al. | |
| 5,174,623 A | 12/1992 | Yada et al. | |
| 5,190,338 A | 3/1993 | Yada | |
| 5,248,179 A * | 9/1993 | Biermacher et al. | ... 296/146.15 |
| 5,344,205 A | 9/1994 | Yada et al. | |
| 5,492,387 A | 2/1996 | Yada et al. | |
| 5,561,954 A * | 10/1996 | Watanabe et al. | ...... 52/204.597 |
| 5,607,197 A * | 3/1997 | Yada | ........................... 296/93 |
| 5,752,352 A * | 5/1998 | Goto et al. | .................... 52/208 |
| 5,803,527 A * | 9/1998 | Fujiya | ......................... 296/93 |
| 5,833,297 A | 11/1998 | Yada et al. | |
| 5,961,174 A * | 10/1999 | Gold | ............................ 296/93 |
| 6,030,020 A * | 2/2000 | Malm | .......................... 296/93 |
| 6,106,047 A * | 8/2000 | Nagahashi et al. | ........... 296/93 |
| 6,196,615 B1 | 3/2001 | Yada | |
| 6,227,598 B1 * | 5/2001 | Ichioka et al. | ................. 296/93 |
| 6,238,769 B1 * | 5/2001 | Nishio et al. | ............... 428/120 |
| 6,241,306 B1 * | 6/2001 | Adorni et al. | ......... 296/146.15 |
| 6,332,640 B1 * | 12/2001 | Cornils et al. | ................. 296/93 |
| RE37,737 E | 6/2002 | Yada | |
| 6,409,244 B1 * | 6/2002 | Nagahashi et al. | ........... 296/93 |
| 6,446,392 B1 | 9/2002 | Maki | |
| 6,460,300 B2 * | 10/2002 | Mikkaichi et al. | ..... 52/204.597 |
| 6,719,351 B2 * | 4/2004 | Cornils et al. | ................. 296/93 |
| 6,814,385 B2 * | 11/2004 | Fujiwara | ...................... 296/93 |

* cited by examiner

*Primary Examiner*—D. Glenn Dayoan
*Assistant Examiner*—G Blankenship
(74) *Attorney, Agent, or Firm*—Wegman, Hessler & Vanderburg

(57) ABSTRACT

A windshield molding for insertion in the space between a windshield glass panel and a window opening of a vehicle body panel. The windshield molding structure includes a clasp portion, a bendable portion, and a channel lip portion. The clasp portion conformingly adheres to the edge of the windshield glass and the bendable portion engages the periphery of the window opening wherein the bendable portion bends and folds under the channel lip portion to provide an air-tight compression seal between the window glass and vehicle body panel, thereby minimizing undesirable air flow whistling and collection of dirt or other debris within the windshield molding structure. A windshield molding is also provided with a water drain channel which guides rainwater along the edge of the molding structure to prevent the water fluid from being sprayed onto the side windows.

10 Claims, 3 Drawing Sheets

WINDSHIELD GASKET DESIGN

FIELD OF INVENTION

This invention relates generally to an automobile windshield molding for a motor vehicle body, and more particularly relates to a windshield molding structure that seals the space between a windshield glass panel and the periphery of a window opening of a vehicle panel.

BACKGROUND OF THE INVENTION

An automobile windshield molding is usually attached around an edge of a windshield panel so as to seal the space between the windshield glass and window opening of a vehicle body panel. Typically, the automobile windshield molding is either directly attached to the vehicle body panel or is supported by a fastener fixedly mounted on the body panel. Various types of moldings can be installed on the bodies of vehicles. For example, it is known to provide windshield moldings having both sealing and decorative functions when they are installed between the peripheral edges of the windshield glass and associated vehicle window opening. These moldings are usually extrusion molded in a long belt shape using elastomers such as rubber and synthetic resins, and usually consist of a support leg which adheres and fastens to the vehicle body side and a decorative portion which is exposed toward the outside.

The extruded molding structure is typically inserted into the space between a window glass panel and an adjacent window opening of a vehicle body panel to form a streamlined transition therebetween. Prior art windshield moldings generally suit their intended purpose of filling the gap between the windshield glass and vehicle body panel; however, some prior art designs are known to create an undesirable whistling noise as air turbulence passes over seams or pockets of the molding structure. In addition, such seams or pockets in the molding structure are susceptible to the collection of dirt and other debris which is difficult and inconvenient to remove from the molding structure.

Accordingly, the present invention is designed to overcome the above limitations by providing a cost-effective windshield molding structure which is easily installed in the space between the windshield glass and window opening to provide a relatively smooth and decorative air tight transition between the windshield glass and vehicle body panel, thereby minimizing air flow whistling and reducing the collection of dirt within the windshield molding structure.

SUMMARY OF THE INVENTION

It is therefore an object of the present invention to provide a windshield molding which includes a channel lip portion and a bendable portion to seal the space between a windshield glass and vehicle body panel. When the molding in installed, the bendable portion contacts the periphery of the window opening of the vehicle body panel causing the bendable portion to flex and bend underneath the channel lip portion, thereby providing a smooth decorative transition between the windshield glass and vehicle body panel. The windshield molding further comprises a clasp portion which adhesively conforms to the peripheral edge of the windshield glass panel. When the windshield molding is installed, the bendable portion is bent and folded under the channel lip portion to provide a tight seal against the vehicle body panel and to minimize undesired air flow whistling and collection of dirt within the windshield molding structure. At the same time, the channel lip portion is configured to substantially overlap the bendable portion, thereby providing a relatively smooth and decorative transition surface between the windshield glass and vehicle body panel.

In one aspect of the invention, the bendable portion comprises a protruding bump portion designed to engage the peripheral surface of the window opening of the vehicle body panel. Thus configured, the protruding bump construction has been shown to facilitate bending of the bendable portion and increase contact pressure between the bendable portion and vehicle body panel, thereby easing installation of the molding structure and improving the compression seal between the windshield glass and vehicle body panel.

An alternative windshield molding embodiment of the present invention comprises a water drain channel positioned adjacently above the clasp portion so as to collect and guide rain water along an edge of the molding structure and prevent the water fluid from being sprayed onto the side windows.

The present invention and its advantages over the prior art will become apparent upon reading the following detailed description and the appended claims with reference to the accompanying drawings.

DETAILED DESCRIPTION OF EXEMPLARY EMBODIMENTS

Figure 1:
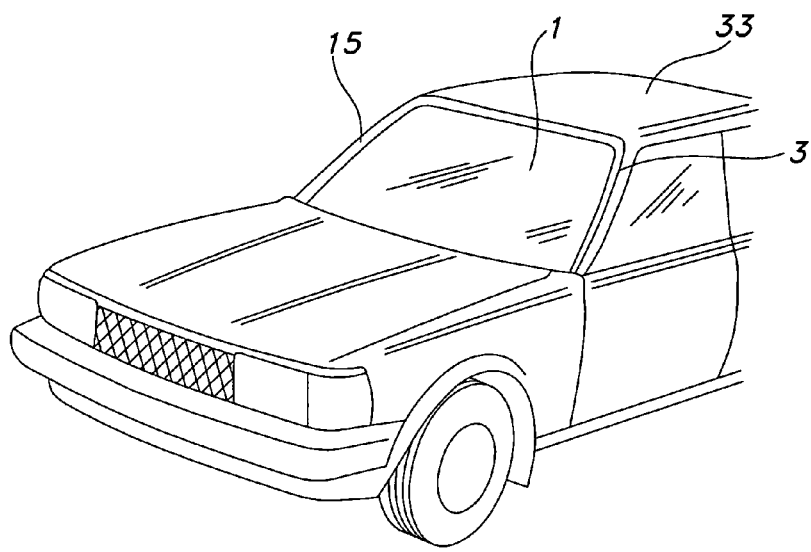
FIG. 1 is a perspective drawing showing the front section of an automobile featuring the windshield molding of this invention.
Figure 2:
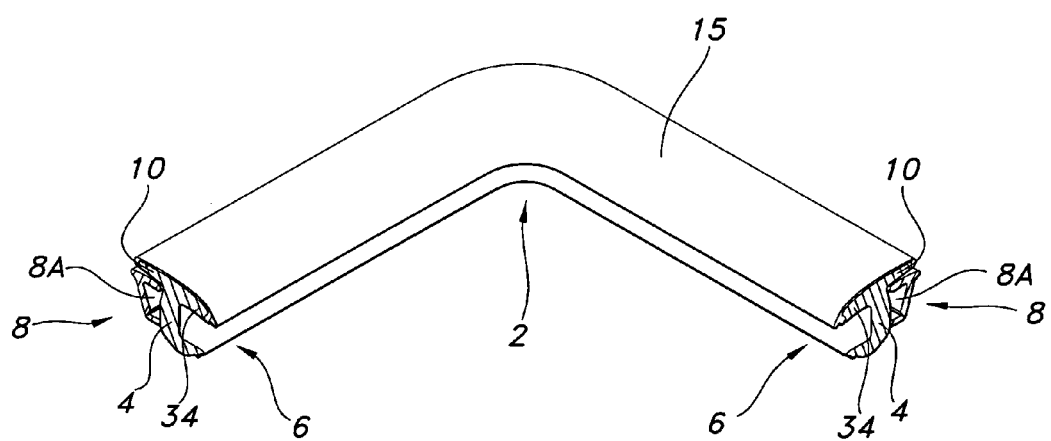
FIG. 2 is a partial perspective drawing showing a short strip of a flexible extrusion-molded windshield molding in a bent condition.
Figure 3:
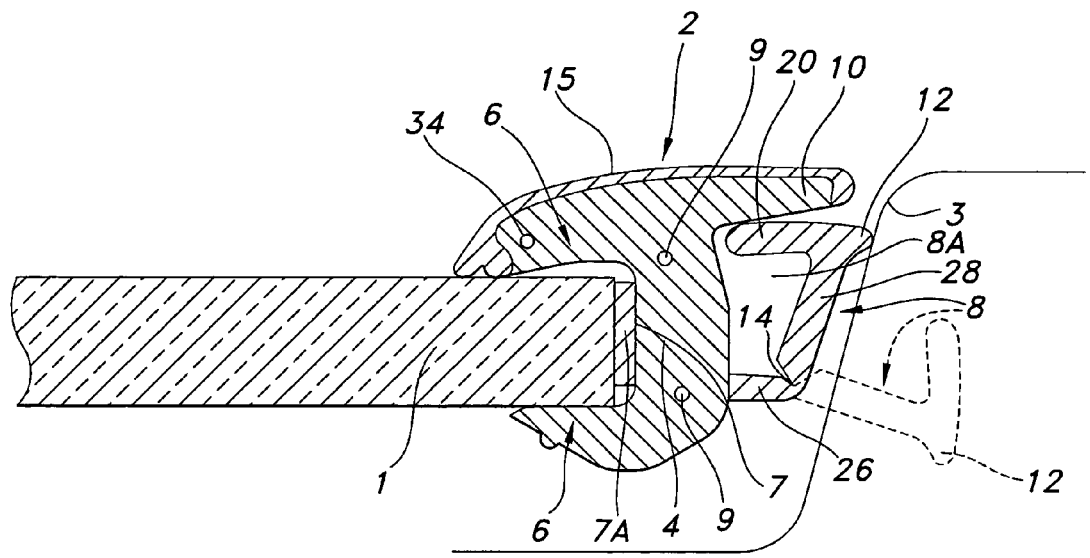
FIG. 3 is a cross-sectional view showing a windshield molding installed between a windshield glass panel and a window opening of a vehicle body panel.

A first embodiment of the present invention is shown in FIGS. 1–3. As shown in FIG. 1, a windshield molding 2 consisting of a lengthy, extrusion molded body is installed to seal the space between the front windshield glass panel 1 and the window opening 3 of an automobile body panel 33. In addition to sealing the space between the windshield glass 1 and window opening 3, the molding structure 2 also comprises a decorative show surface 15 to provide a decorative transition between the windshield glass 1 and window opening 3 of the vehicle body panel or frame 33.

In FIG. 2, only a short section view of the flexible extrusion molded strip length is shown, although it is understood that when the molding 2 is incorporated into the assembly of FIG. 1, the length of the molding 2 extends the entire perimeter of the window opening 3.

Turning to FIGS. 2 and 3, a windshield molding 2 is preferably extrusion molded in the shape of a strip, comprising a base portion 4, a clasp portion 6, a bendable portion 8, and a channel lip portion 10 and opposing window lip 34. The channel lip 10 is adapted for juxtaposition along the vehicle frame member with the opposing window lip adapted for contiguous arrangement over a windshield glass pane or the like. The bendable portion 8 includes a support stub section 26 extending transversely from the base 4 and a pivotable leg 28 connected to the stub section 26 at living hinge or pivot point 14. The pivotal leg 28 includes a channel side portion 20 adapted for folding beneath the channel lip 10. The windshield molding 2 is usually made of elastic materials such as rubber, synthetic resin, or thermoplastic elastomer (TPE), and is extrusion molded integrally to an elongated shape using well-known extrusion molding techniques to form requisite cross-sectional shapes throughout the length as exemplified in FIGS. 3–5. The molding 2 further comprises a pair of wire cores 9 longitudinally extending though the base to support and reinforce the configuration of the extrusion molding structure 2 as known in the art. Representative extrusion molding techniques that may be used in the present invention are disclosed in U.S. Pat. Nos. 5,833,297 and 6,196,615. The disclosures of both of these patents are incorporated by reference herein.

In a preferred embodiment of the present invention, such well-known co-extrusion molding techniques may be implemented to form the bendable portion 8 from a material that is more flexible than the material used to form the rest of the molding structure. As discussed in more detail below, this serves to facilitate bending of the pivotal leg 28 proximate pivot point 14 while allowing the base portion 4, channel lip portion 10, clasp portion 6, and remaining molding structure to maintain its original shape and configuration after the molding is installed in the window opening.

As best shown in FIG. 3, the windshield molding is inserted into the gap formed between the periphery of the window frame or opening 3 and windshield glass 1. The clasp portion 6 is configured in shape and size to conformingly adhere to the peripheral edge of the windshield glass panel 1, thereby fixedly mounting the windshield glass 3 to the window opening 3 of the vehicle body panel. Most preferably, an adhesive 7A, for example double sided adhesive tape, can be applied to an inner wall 7 of the clasp portion 6, thereby improving the adherence of the clasp portion to the peripheral edge of the windshield glass panel 1. As described herein, the molding structure 2 can be installed in the window opening 3 of the vehicle body panel after the windshield has been inserted and attached thereto. Alternatively, the molding structure can first be inserted into the associated window opening, and then the windshield glass panel can be attached thereto.

As best shown in FIG. 3, when the window glass 1 and molding 2 are installed in the window opening 3, the generally L-shaped bendable portion 8 of the windshield molding 2 is bent along a first longitudinal axis from a position substantially coplanar to the windshield glass panel 1 (as shown in phantom), to a bent position in which leg 28 and a top member 20 engages and presses against the periphery of the window opening 3 so as to rotate or fold the bendable portion at a pivot point 14 under the channel lip portion 10. That is, the top portion 20 of leg 28 is folded or tucked under the channel lip 10. In this way, the generally L-shaped bendable portion 8 provides an air-tight compression seal between the molding structure 2 and the window opening 3 of the vehicle body panel, thereby minimizing undesired air flow whistling and collection of dirt in area 8A of the molding structure. Since the channel lip portion 10 projects over the folded bendable portion 8 and extends toward the peripheral edge of the window opening 3, the present invention also provides a relatively smooth and decorative transition surface 15 between the windshield glass 1 and window opening 3.

Figure 4:
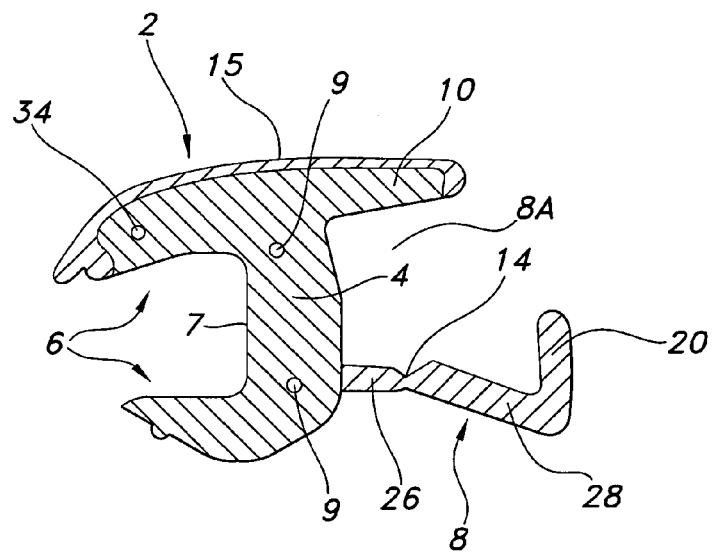
FIG. 4 is a cross-sectional view of an alternative windshield molding configuration of this invention.

In the preferred embodiment of the invention of FIG. 3, there is shown a protruding bump section 12 which is constructed near the vertex of the bendable portion on leg 28 and is directed away from the channel lip portion 10. During installation, the protruding bump section 12 is designed to engage the peripheral edge of the window opening 3 so that the protruding section 12 when so engaged provides an opposing force vector near the vertex of the bendable portion to facilitate counter-clockwise rotation of the bendable portion 8 under the channel lip portion 10 when the molding 2 is installed in the window opening 3. In addition, once the windshield molding 2 is installed, the protruding section 12 increases the contact pressure of the air-tight seal between the bendable portion 8 of the molding structure and the window opening 3 of the vehicle body panel. Such configuration provides improved resistance to air flow whistling and collection of dirt in area 8A of the molding structure. As best shown in FIG. 3, the protruding section 12 is preferably constructed in a generally circular or radial shape, however, skilled artisans will appreciate that many other geometric shapes may be used as well. Moreover, as seen in FIG. 4, the present invention contemplates providing a bending portion 8 without a protruding section. These and other molding structure configurations can be provided without departing from the scope and spirit of the present invention.

Figure 5:
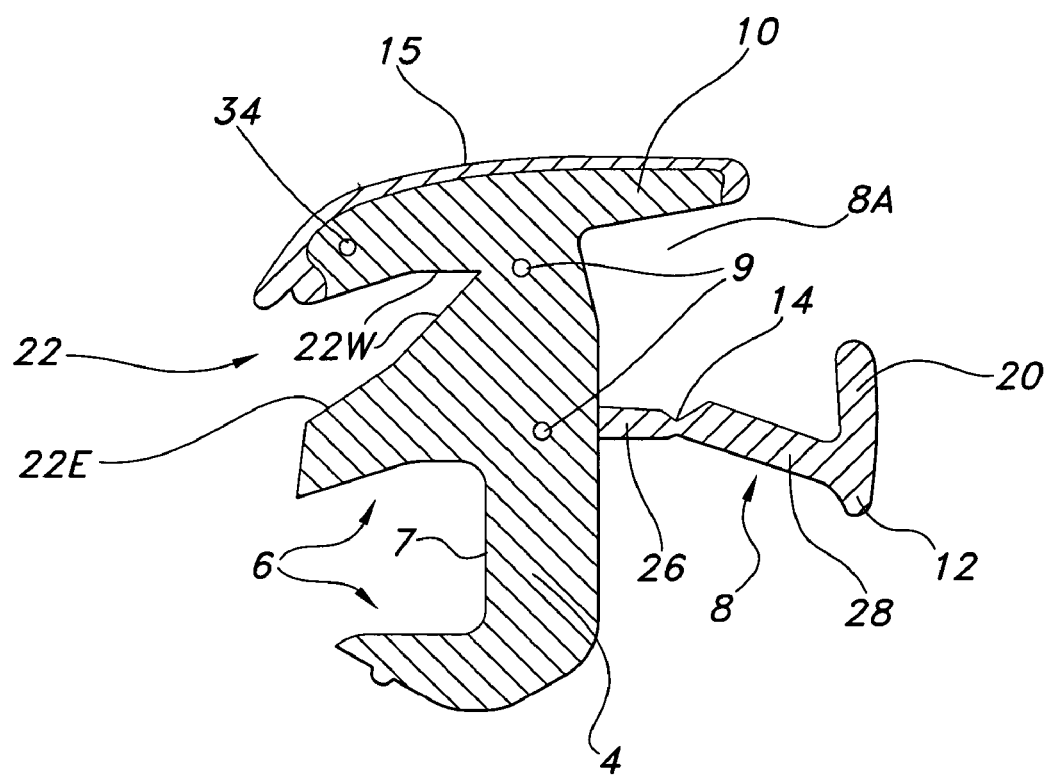
FIG. 5 is a cross-sectional view of yet another windshield molding configuration of this invention.

Another embodiment of the present invention is shown in FIG. 5. This alternative embodiment is equally effective as the first embodiment, but the molding structure 2 of the second embodiment further comprises a water drain channel 22. As shown in FIG. 5, the drain channel 22 has a generally triangular cross section and is positioned adjacently above the clasp portion 6. An angular outward edge portion 22E cooperates with a pair of inside walls 22W of the water drain channel 22. Accordingly, rain water collected on the windshield glass surface may be guided onto the angular edge portion 22E and along the inside walls 22W of the water drain channel, thereby helping to prevent water from traversing over the channel lip portion 10 and being sprayed onto the side windows of the vehicle.

Most preferably, the invention implements well known co-extrusion techniques, such as disclosed and incorporated by reference above, to form specific portions of the molding structure from different extrusion materials. In this way, the bendable portion of the molding structure can be formed from a material that is different and more flexible than the relatively rigid material used to form the remaining portions of the molding structure. Therefore, when the windshield molding 2 is thus installed, the base portion 4, clasp portion 6, lip portions 10 and 34, and water drain channel 22 (if applicable) tend to maintain their shape and original configurations because they have been formed with a relatively rigid extrusion material. However, the bendable portion 8, having been formed with relatively flexible extrusion material, can be easily bent and folded under the channel lip portion to provide an air-tight compression seal against the window opening of the vehicle body panel to minimize air flow whistling and collection of dirt within the molding structure. With the channel lip portion 10 being configured in shape and size to project over the bendable portion 8 and extend toward the peripheral edge of the adjacent window opening 3, the present invention also provides a relatively smooth and decorative transition surface 15 between the windshield glass 1 and window opening 3 of the vehicle body panel.

As described herein, the molding structure can be installed in the window opening of the vehicle body panel after the windshield has been inserted and attached thereto. Alternatively, the molding structure can first be inserted into the associated window opening, and then the windshield glass panel can be attached thereto.

While specific embodiments of the present invention have been described, it will be apparent to those skilled in the art that various modifications thereto can be made without departing from the spirit and scope of the invention as defined in the following claims.

What is claimed is:

1. A vehicle molding for placement between a pane of glass and vehicle frame, said molding comprising:
   a. a base;
   b. a window lip extending from said base and adapted for positioning against said glass pane;
   c. a channel lip extending from said base and laterally opposed from said window lip, said channel lip adapted for juxtapositioning along said vehicle frame; and
   d. a bendable portion extending from said base, said bendable portion having a stub connected to said base and extending transversely therefrom at a substantially normal angle, a pivotal leg having a top portion at one end thereof such that the pivotal leg generally defines an L-shape, and a living hinge connecting said pivotal leg to said stub, said bendable portion adapted for pivoting of said pivotal leg to a position wherein said channel lip overlaps the top portion of the L-shaped leg with all of said L-shaped leg disposed beneath said channel lip to form a seal between the molding and said vehicle frame.

2. Vehicle molding as recited in claim 1 wherein said pivotal leg comprises a protruding bump adapted to engage said frame to facilitate rotation of said bendable portion under said channel lip.

3. Vehicle molding as recited in claim 1 wherein said base portion, channel lip, and window lip are formed from a material having a first durometer hardness and wherein said bendable portion is formed from a material having a second durometer hardness that is less than said first durometer hardness.

4. Vehicle molding as recited in claim 1 wherein said base further includes a clasp portion adapted to securely hold said glass pane therein with said window lip overlying a portion of said glass pane.

5. Vehicle molding as recited in claim 4 wherein said clasp portion comprises an adhesive means disposed therein.

6. Vehicle molding as recited in claim 5 wherein an adhesive means comprises a double sided tape having adhesive on both of said sides.

7. Vehicle molding as recited in claim 4 further comprising a water drain channel disposed above said clasp portion of said base.

8. A vehicle molding for placement between a pane of glass and vehicle frame, said molding comprising:
   a. a base;
   b. a window lip extending from said base and adapted for positioning against said glass pane;
   c. a channel lip extending from said base and laterally opposed from said window lip, said channel lip adapted for juxtapositioning along said vehicle frame; and
   d. a bendable portion extending from said base, said bendable portion having a stub connected to said base and extending transversely therefrom at a substantially normal angle, a pivotal leg and a living hinge connecting said pivotal leg to said stub forming a pivot point, wherein the living hinge has a thinner cross-section with respect to said stub and said pivotal leg so that the pivotal leg pivots at said pivot point formed by the living hinge such that the channel lip overlaps all of the pivotal leg to form a seal between the molding and said vehicle frame.

9. Vehicle molding as recited in claim 8 wherein the pivotal leg has a top portion at one end thereof such that the pivotal leg generally defines an L-shape, wherein said pivotal leg pivots about said pivot point to a position wherein said channel lip overlaps the top portion of the L-shaped leg.

10. Vehicle molding as recited in claim 8 wherein said pivotal leg comprises a protruding bump adapted to engage said frame to facilitate rotation of said bendable portion under said channel lip.

* * * * *